United States Patent [19]

Fortsch

[11] Patent Number: 4,542,871
[45] Date of Patent: Sep. 24, 1985

[54] CLAMP FOR MOUNTING CABLE ON CHANNEL SUPPORT

[75] Inventor: William A. Fortsch, Bernardsville, N.J.

[73] Assignee: Thomas & Betts Corporation, Raritan, N.J.

[21] Appl. No.: 466,395

[22] Filed: Feb. 14, 1983

[51] Int. Cl.[4] .............................................. F16L 3/08
[52] U.S. Cl. ...................................... 248/73; 52/466; 52/665; 248/68.1
[58] Field of Search .................... 248/73, 74 A, 74 B, 248/74 R, 316.9, 68 R, 68 CB, 62, 63, 65, 231.8, 72, 221.3, 221.4, 222.3, 228; 24/289, 297, 292, 293, 16 R; 52/463, 466, 718, 665

[56] References Cited

U.S. PATENT DOCUMENTS

| | | | |
|---|---|---|---|
| 1,742,838 | 1/1930 | Williams | 248/72 |
| 1,818,659 | 8/1931 | Tournier | 248/72 |
| 1,945,332 | 1/1934 | Robinson | 248/228 |
| 2,064,290 | 12/1936 | Campbell et al. | 248/72 |
| 2,618,685 | 11/1952 | Lewis | 174/161 |
| 3,185,419 | 5/1965 | Kindorf | 248/73 |
| 3,208,560 | 9/1965 | Cote | 189/36 |
| 3,226,069 | 12/1965 | Clarke | 248/73 |
| 3,324,853 | 6/1967 | Czorny et al. | 248/74 R |
| 3,370,815 | 2/1968 | Opperthauser | 248/74 |
| 3,417,951 | 12/1968 | Rebentisch, Jr. | 248/62 |
| 3,463,428 | 8/1969 | Kindorf et al. | 248/72 |
| 3,486,726 | 12/1969 | Kindorf et al. | 248/72 |
| 3,521,842 | 7/1970 | Opperthauser | 248/74 B |
| 3,522,921 | 8/1970 | Lytle | 248/62 |
| 3,527,432 | 9/1970 | Lytle | 248/62 |
| 3,532,311 | 10/1970 | Havener | 248/62 |
| 3,650,499 | 3/1972 | Biggane | 248/62 |
| 3,721,412 | 3/1973 | Kindorf | 248/73 |
| 3,894,707 | 7/1975 | Heard | 248/73 |
| 4,044,428 | 8/1977 | Kowalski | 24/16 R |
| 4,055,285 | 10/1977 | Bott | 52/718 |
| 4,119,285 | 10/1978 | Bisping | 248/72 |
| 4,125,240 | 11/1978 | Heard | 248/218.4 |
| 4,157,800 | 6/1979 | Senter | 248/72 |
| 4,185,802 | 1/1980 | Myles et al. | 248/74 |
| 4,353,519 | 10/1982 | Bogart | 248/72 |
| 4,389,823 | 6/1983 | Player | 52/463 |

OTHER PUBLICATIONS

Crouse-Hinds "CABLOK ™ Cable Support System", Catalog, Dec. 1979, pp. D-1-D-3.

Primary Examiner—William H. Schultz
Assistant Examiner—Ramon O. Ramirez
Attorney, Agent, or Firm—Robert M. Rodrick; Salvatore J. Abbruzzese

[57] ABSTRACT

A self-supportable cable clamp for attaching a cable transversely across inwardly directed flanges of a U-shaped support channel includes an elongate base having a rigid lower portion adapted to reside within the channel and a pair of flexible, cantilevered arms adapted to lie exteriorly of the channel. The base lower portion has a pair of longitudinally spaced engagement surfaces that together with opposed contact surfaces on the flexible arms define a pair of openings for resiliently receiving the inwardly directed channel flanges. The base is adapted to be installed by insertion thereof into the channel and rotation thereabout until the channel flanges are received in the base openings. A cable strap of the self-locking type is supported by the base for attachment to a cable and for securing such cable to the base as mounted on the channel.

20 Claims, 5 Drawing Figures

CLAMP FOR MOUNTING CABLE ON CHANNEL SUPPORT

FIELD OF THE INVENTION

The present invention relates to a clamp for clamping an article such as an electrical cable to a support channel and more particularly to a clamp for securing articles of different size and for accommodating channels of different configuration.

BACKGROUND OF THE INVENTION

Articles, as the term is used herein, are intended to be inclusive of generally cylindrical members such as electrical cables, wires, pipes, tubes, conduits, etc., and which are often mechanically attached to supporting structures with clamping devices. There are typically two types of channels most used for mounting such articles and each includes a channel having a generally U-shaped cross-section with inwardly turned edges or flanges on the legs of the channel. Both such channel constructions are illustrated in U.S. Pat. No. 3,486,726, issued to Kindorf et al on Dec. 30, 1969.

In attempting to address the problems of interchangeability between support channels and accommodation of articles of different dimensions, the art has seen a variety of clamping devices. Although there are certain known clamps that utilize self-interlock techniques, such as spring-clips and the like, by far the most widely used clamps which, today, are accepted as a standard in the construction industry are those which are secured by bolt or screw. Such conventional clamps comprise a pair of clamping straps of solid sheet metal, one for each side of the article. Each of these straps is inserted into the support channel for engagement with the inturned channel flanges. These straps are generally preformed to accurately match the curvature of a particular size article, the other ends of such straps being bolted together so as to hold the article on the support channel. As such, these conventional straps are not suited for clamping articles of different sizes, thereby necessitating stocking a number of such clamps. Also, handling of such clamps is difficult and time-consuming as the straps are often not self-supporting in the channel absent an article and thus usually require holding until the article is secured by bolting.

SUMMARY OF THE INVENTION

It is therefore an object of the present invention to provide an improved clamp for clamping articles to support channels.

It is another object of the invention to provide a clamping base that is self-supporting and which is suited for resilient attachment to channel flanges of different configuration.

In accordance with the invention, a clamp for attaching an article, such as a cable, transversely across a support channel having spaced inwardly extending flanges along its longitudinal extent and defining an elongate slot therebetween, comprises a body for resilient detachable securement to such flanges, the body having a pair of opposed flange receiving openings. Each opening is defined by an engagement surface adapted to reside within the channel and engage a lower flange portion and a contact surface adapted to overlie the channel and contact an upper flange portion. At least one of either the engagement surface or the contact surface of each opening is flexible. The engagement surface and the contact surface of each opening is preferably spaced for resilient interference fit with a flange. The clamp also includes article clamping means on the body for attachment to the article and for securing the article against the body.

In a particular form, the body includes a rigid first portion having the engagement surfaces thereon and a flexible second portion including a pair of cantilevered, flexible arms supported by the first portion. The flexible arms are preferably centrally supported by a support and taper upwardly and outwardly therefrom toward the free and unsupported arm ends.

DETAILED DESCRIPTION OF THE PREFERRED EMBODIMENT

Figure 1:
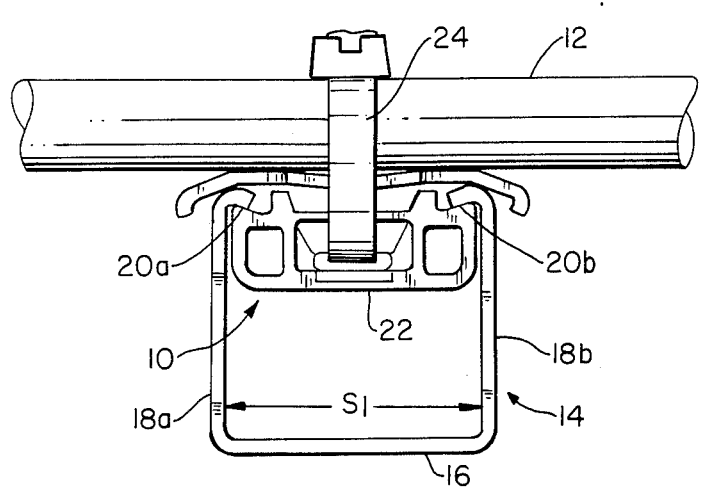
FIG. 1 is a side elevation view of a clamp of the present invention showing the attachment of an electrical cable to a support channel.

Referring now to the drawing, there is shown in FIG. 1 a clamp 10 clamping an electrical cable to a support channel 14. In accordance with the invention, clamp 10 is adapted to attach any of a variety of articles of generally cylindrical configuration having a range of outer diameters. The channel 14 is typically an elongate member and, as depicted, the cable 12 is securely affixed thereto in a manner extending transversely across such channel 14.

The support channel 14, which may be normally fastened to a machine or other structure, is of generally U-shaped cross-section, having a base 16 and laterally spaced side walls 18a and 18b. The upper ends of the side walls have inwardly directed flanges 20a and 20b that are laterally spaced from each other and define a longitudinal slot S (FIG. 5) therebetween extending the length of the channel 14. The inwardly turned flanges 20a and 20b may be slightly beveled downward toward base 16, as shown in FIG. 1, or may be formed to face fully downward such that a portion of the flanges extends substantially parallel to the channel side walls.

Figure 2:
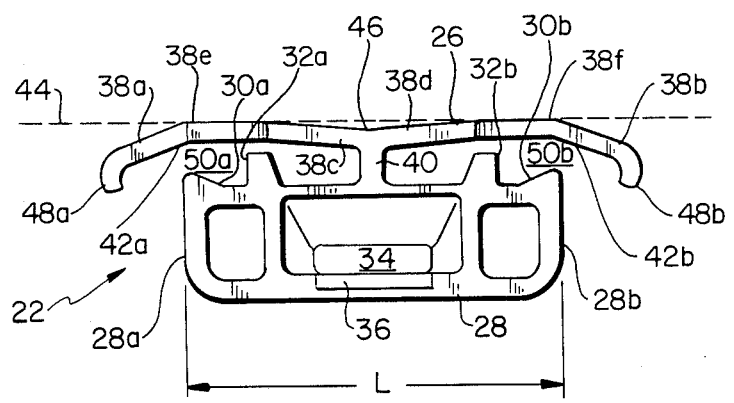
FIG. 2 is a side elevation view of a clamping base from the clamp of FIG. 1.

In the preferred form, as illustrated in FIG. 1, the clamp 10 comprises a clamping base 22 that is self-supportable on the channel 14 and a cable bundling strap 24 of the self-locking type as described more particularly in commonly-owned U.S. Pat. No. 3,186,047. As shown with reference also to FIGS. 2 and 3, the details of the clamping base 22 may be more fully understood.

Figure 3:
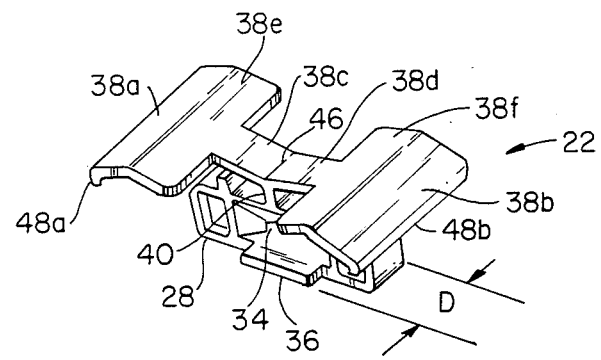
FIG. 3 is a top perspective view of the clamping base of FIG. 2.

The clamping base 22 comprises an elongate body having an upper portion 26 that is adapted to lie exteriorly of the channel and overhang the flanges 20a and 20b and a lower portion 28 that is adapted to reside within the channel 14 between the side walls 18a and 18b thereof. The lower portion 28 is of relatively rigid construction and has a longitudinal extent L that is less than the lateral spacing $S_1$ between the channel side walls 18a and 18b but greater than the transverse spacing of the slot S between the flanges 20a and 20b. The lower portion 28 also has a maximum depth extent D, as indicated in FIG. 3, that is less than the slot spacing S for insertion of the base lower portion 28 into the channel interior as will be described hereinbelow.

At its longitudinal ends 28a and 28b, the lower portion 28 has a pair of opposed, spaced flange engagement surfaces 30a and 30b. In the preferred configuration, the engagement surfaces 30a and 30b are beveled upwardly and outwardly in a manner corresponding to the bevel of the flanges 20a and 20b for engagement therewith. Spaced longitudinally interiorly of the engagement surfaces 30a and 30b on the lower portion are a pair of stop surfaces 32a and 32b. Toward the bottom of the lower portion 28 and generally centrally thereof, an opening 34 is provided for free receipt of the cable strap 24. Adjacent opening 34 a pair of projecting ledges 36 may be provided for guiding the insertion of the strap 24 through the opening 24 during assembly of the clamp 10.

The upper portion 26 of the clamping base 22 comprises a pair of flexible, cantilevered arms 38a and 38b that are preferably supported on the lower portion 28 by a single, centrally located support 40. The arms 38a and 38b each have a longitudinal extent that extends beyond the lower portion ends 28a and 28b and which are configured to extend beyond the outer lateral extent of the support channel 14. The arms 38a and 38b have flange contacting surfaces 42a and 42b, respectively, that are adapted to contact the upper, outer surfaces of the flanges 20a and 20b. The more longitudinally interior arm portions 38c and 38d taper upwardly and outwardly from the central support 40 to generally flat arm portions 38e and 38f which provide surfaces for engagement with the cable 12 along a plane 44 extending longitudinally with the length of the clamping base 22. In the preferred arrangement, the joint 46 of the tapering arm portions 38c and 38d is located at a point below the plane 44 and intermediate such plane 44 and the engagement surfaces 30a and 30b on the lower portion 28. The free, unsupported ends of the cantilevered arms 38a and 38b taper downwardly and outwardly from flat arm portions 38e and 38f terminating in downwardly turned lips 48a and 48b, respectively, lips 48a and 48b projecting preferably below the outer edge of the beveled engagement surfaces 30a and 30b.

The engagement surfaces 30a and 30b on the lower portion 28 and the contacting surfaces 42a and 42b on the upper portion 26 are provided in opposed, spaced relation and each pair of opposing surfaces defines a flange receiving opening 50a and 50b. In the preferred embodiment, the openings 50a and 50b are each formed to define a spacing less than the thickness of the respective flanges 20a and 20b to thereby provide a resilient interference fit therewith. The clamping base 22 is preferably formed as an integral, unitary part of plastic although other suitable materials such as metal or composites of metal and plastic may be used.

Figure 4:
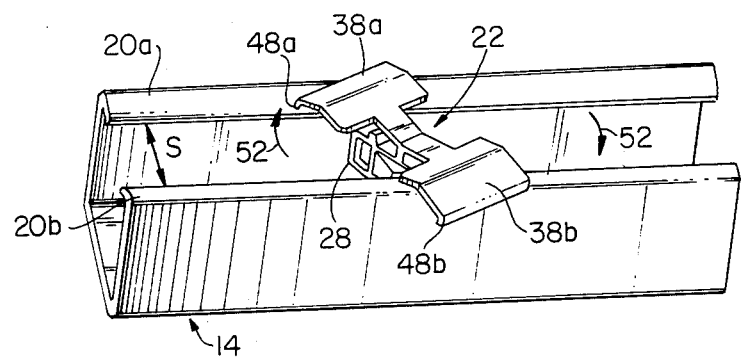
FIGS. 4 and 5 are perspective views illustrating steps for mounting the clamping base to the support channel.
Figure 5:
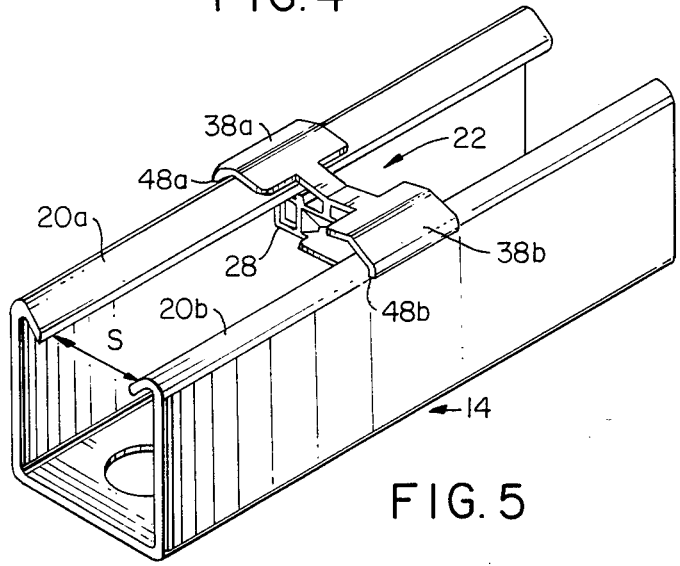

Having described the details of the cable clamp 10 herein, the assembly and installation of the clamp onto the support channel 14 and about the cable 12 are now described with reference to FIGS. 1, 4 and 5. The clamping base 22 is initially positioned manually with the elongate base extent extending longitudinally over the slot S of the channel 14. The lower portion 28 of the clamping base 22 is then inserted into the slot S with the engagement surfaces 30a and 30b extending slightly below the lower surfaces of the flanges 20a and 20b. As depicted in FIG. 4, the base 22 is then rotated in a manner as indicated by the arrows 52 to place the base 22 in a transverse position relative to the channel 14. During such rotation, the lips 48a and 48b on the arms 38a and 38b, respectively, strike the upper surface of the flanges, flexing the arms 38a and 38b upwardly with the flanges 20a and 20b being received in the openings 50a and 50b. As the arms 38a and 38b reach the transverse position as depicted in FIG. 5 with the lips 48a and 48b overhanging the channel laterally thereof, the arms 38a and 38b "snap" back downwardly onto the flanges 20a and 20b. The stop surfaces 32a and 32b on the lower portion 28 limit the lateral movement of the base 22 on the flanges 20a and 20b such that the arms 38a and 38b are each suitably located on the flanges 20a and 20b.

In the position of FIG. 5, the engagement surfaces 30a and 30b on the base lower portion 28 engage the lower surfaces of the flanges 20a and 20b and the contact surfaces 42a and 42b on the arms 38a and 38b contact the upper surfaces of the flanges 20a and 20b (FIG. 1). The clamping base 22 is accordingly self-supporting as mounted on the channel 14 and is ready to receive the cable strap 24. The cable strap 24, as shown in FIG. 1, is then fed through the opening 34 in the clamping base, although the strap 24 may be held in the base opening prior to installation of the base to the channel. A cable 12, or other desirable article, is then positioned on the clamping base arms 38a and 38b transversely across the channel axis. The cable strap 24 is then tightened and interlocked about the cable 12 in a manner known in the art. As the cable strap 24 is tightened, the inner tapered arm portions 38c and 38d will tend to flex (as the point 46 joining such arms is below the cable engaging plane 44) allowing the base lower portion 28 to be drawn up tightly into engagement with the flanges 20a and 20b. Even where the flange receiving openings 50a and 50b are provided with a slight clearance for flange receipt instead of an interference fit, it should be appreciated that upon tightening of the cable strap 24 about the cable 12, the flexing of the arm portions 38c and 38d can allow sufficient upward movement of the lower portion 28 to close such clearance and cause tight engagement of the surfaces 30a and 30b with the flanges 20a and 20b.

It should now be understood that the clamp of the present invention has advantages over the known clamping devices. For example, the resiliency of the flexible arms enables use with support channels having flanges of different configurations and thicknesses. The use of the cable strap allows attachment to cables or other articles having a range of outer diameters. Ease of handling is provided by the self-supportability of the clamping base onto the channel without need for additional holding prior to cable attachment. Furthermore, the clamping base may be installed on a channel at its midspan by the rotation technique described herein or may be slidably installed at an open channel end. Moreover, where the clamping base is made of plastic, an additional degree of insulation is provided between the conductors in electrical cables and the metallic support channel.

Having described the preferred embodiment of the clamp herein, it should be appreciated that various other modifications to the foregoing particularly described invention will now be evident to those skilled in the art. Accordingly, the preferred embodiment as described herein is intended in an illustrative rather than a limiting sense. The true scope of the invention is set forth in the following claims.

I claim:

1. A clamp for attaching an article, such as a cable or the like, transversely across a support channel having spaced inwardly extending flanges along its longitudinal extent and defining an elongate slot therebetween, comprising:
 a body for resilient detachable securement to said inwardly extending flanges, said body having a pair of opposed flange receiving openings, each of said openings being defined by an engagement surface adapted to reside within said channel and engage a lower portion of a flange and a contact surface adapted to overlie said channel and contact an upper portion of a flange, at least one of either engagement surface or said contact surface of each opening being flexible, said engagement surface and said contact surface of each opening being spaced for resilient interference fit with a flange; and
 article clamping means on said body for attachment to said article and for securing said article against said body.

2. A clamp according to claim 1, wherein said body is generally elongate, said openings being spaced along the longitudinal axis of said body such that access to such openings is provided at the longitudinal ends thereof.

3. A clamp according to claim 2, wherein said body includes a rigid first portion having said engagement surfaces thereon.

4. A clamp according to claim 3, wherein said body includes a flexible second portion including a pair of cantilevered, flexible arms supported by said rigid first portion, free ends of such cantilevered arms facing longitudinally away from each other, said flexible cantilevered arms spacedly overlying said engagement surfaces on said rigid first portion, the undersurface of each flexible arm portion defining said contact surfaces.

5. A clamp according to claim 4, wherein said cantilevered, flexible arms are both supported by a generally centrally located support.

6. A clamp according to claim 5, wherein upper surfaces of each flexible, cantilevered arm provide article engagement surfaces, such article engagement surfaces defining a plane extending along the longitudinal direction of said body, each of said arm portions tapering from said article engagement surfaces toward said body second portion to a point on said centrally located support, such point being disposed intermediate said plane and said engagement surfaces on said body second portion.

7. A clamp according to claim 4, wherein each of said cantilevered arms has at its free end a down-turned lip projecting toward said engagement surfaces on said body first portion and extending along an extent transversely to the longitudinal direction of said body.

8. A clamp according to claim 4, wherein each of said engagement surfaces on said rigid first portion has stop means thereon for locating said body in a fixed position transversely on said support channel.

9. A clamp according to claim 1, wherein said article clamping means comprises a self-locking strap.

10. A clamp according to claim 9 wherein said body includes an opening for receipt of said strap.

11. A self-supporting base for use in a clamp of the type for attaching an article, such as a cable or the like, transversely across a support channel having two spaced inturned flanges defining an elongated slot therebetween, such clamp including means for securement to said article for holding said article secure relative to said channel, comprising:
 a lower portion for residence within said channel and having a pair of opposed engagement surfaces for engaging respective undersurfaces of said flanges; and
 an upper portion for lying exteriorly of said channel flanges and having a pair of opposed cantilevered, flexible arms supported on said lower portion, each of said arms having a contact surface for contacting a respective upper surface of said flanges, each contact surface of said upper portion and engagement surface of said lower portion being mutually spaced and defining an opening for receipt of a respective flange therein.

12. A base according to claim 11, wherein said lower portion and said upper portion are integrally formed of a plastic-like material.

13. A base according to claim 11, wherein said contact surface and said engagement surface defining each opening are spaced to provide an interference fit with a respective flange.

14. A base according to claim 11, wherein said lower portion and said upper portion are each generally elongate and wherein said flexible arms are joined at a substantially centrally located support, each of said arms tapering upwardly and outwardly toward its free end such that an upper surface of each of said arms lies further vertically from said lower portion than said joint of said arms at said centrally located support.

15. A base according to claim 11, wherein the longitudinal ends of said engagement surfaces on said lower portion are beveled upwardly and outwardly toward said upper portion.

16. A base according to claim 11, further including means for supporting said article securement means.

17. In combination:
 (a) a support channel having spaced inwardly extending flanges along its longitudinal extent and defining an elongate slot therebetween; and
 (b) a clamp for attaching an article, such as a cable or the like, transversely across said channel, said clamp comprising:
 a body for resilient detachable securement to said inwardly extending flanges, said body having a pair of opposed flange receiving openings, each of said openings being defined by an engagement surface adapted to reside within said channel and engage a lower portion of a flange and a contact surface adapted to overlie said channel and contact an upper portion of a flange, at least one of either engagement surface or said contact surface of each opening being flexible, said engagement surface and said contact surface of each opening being spaced for resilient interference fit with a flange; and
 article clamping means on said body for attachment to said article and for securing said article against said body.

18. The invention according to claim 17, wherein said body is generally elongate, said openings being spaced along the longitudinal axis of said body such that access to such openings is provided at the longitudinal ends thereof, said body including a rigid first portion having said engagement surfaces thereon, said rigid first portion having an elongate extent greater than the transverse spacing of said channel slot.

19. The invention according to claim 18, wherein said body includes a flexible second portion including a pair of cantilevered, flexible arms supported by said rigid first portion, free ends of such cantilevered arms facing longitudinally away from each other, said flexible cantilevered arms spacedly overlying said engagement surfaces on said rigid first portion, the undersurface of each flexible arm portion defining said contact surfaces, the second portion having an elongate extent greater than the transverse spacing of said slot such that said cantilevered, flexible arms may each extend over a respective flange.

20. The invention according to claim 19, wherein said rigid first portion has a depth extent less than the transverse spacing of said slot such that said rigid first portion may be inserted into said slot midspan of said channel with its elongate extent generally parallel to said slot and then rotated such that said rigid first portion elongate extent is generally transverse to said slot.

* * * * *